US006847947B1

(12) United States Patent
Kambour et al.

(10) Patent No.: US 6,847,947 B1
(45) Date of Patent: Jan. 25, 2005

(54) METHOD AND SYSTEM FOR REDUCED COST DEBIT PROCESSING

(75) Inventors: David Gregg Kambour, Parkland, FL (US); Christopher Marczyk, Plantation, FL (US); William Anthony Myers, Coram, NY (US)

(73) Assignee: First Data Corporation, Hackensack, NJ (US)

( * ) Notice: Subject to any disclaimer, the term of this patent is extended or adjusted under 35 U.S.C. 154(b) by 0 days.

(21) Appl. No.: 09/484,958

(22) Filed: Jan. 18, 2000

(51) Int. Cl.[7] .............................................. G06F 17/60
(52) U.S. Cl. ........................................................ 705/39
(58) Field of Search .......................... 235/379; 705/39

(56) References Cited

U.S. PATENT DOCUMENTS

| | | | |
|---|---|---|---|
| 5,357,563 A | | 10/1994 | Hamilton et al. |
| 5,878,141 A | * | 3/1999 | Daly ............................ 380/25 |
| 5,907,832 A | * | 5/1999 | Pieterse et al. ............... 705/39 |
| 6,029,151 A | * | 2/2000 | Nikander ...................... 705/39 |
| 6,138,107 A | * | 10/2000 | Elgamal et al. ............... 705/39 |
| 6,138,907 A | * | 10/2000 | Mori et al. ................... 235/379 |
| 6,170,745 B1 | * | 1/2001 | Schilling ................... 235/382.5 |
| 6,405,174 B1 | * | 6/2002 | Walker ........................ 705/14 |

FOREIGN PATENT DOCUMENTS

WO  WO/0154026 A1  *  7/2001

OTHER PUBLICATIONS

Fieldon, InfoWorld, Verza Pays Off Big For Merchants.*

* cited by examiner

Primary Examiner—Geoffrey R. Akers
(74) Attorney, Agent, or Firm—Brooks Kushman P.C.

(57) ABSTRACT

A method is provided for processing debit transactions at the lowest cost available. The method is comprised of the following steps: providing a merchant identification number and an account number BIN file to a debit processing center; matching the merchant identification number against at least one merchant database at the debit processing center; providing a merchant network list from the at least one merchant database based upon the match of the merchant identification number; providing a customer network list from the at least one merchant database based upon the match of customer identification number; creating a merchant-customer network list by matching at least one common element from the merchant network list and the customer network list. Next the system determines the validity for each common element of the merchant-customer network list and eliminates each invalid common element from the merchant-customer network list. Subsequently, the system sorts the elements of the merchant-customer network list based on network fee and communicates with a routing and processing database to determine the routing and processing method for each merchant customer element. Finally, the system applies the lowest cost element for routing and processing a debit transaction.

11 Claims, 3 Drawing Sheets

METHOD AND SYSTEM FOR REDUCED COST DEBIT PROCESSING

TECHNICAL FIELD

The present invention relates to a method for routing of debit processing in a customer merchant environment based on lowest cost.

BACKGROUND ART

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need of having the correct amount or providing change therefor. Furthermore, the handling, and managing (including guarding) of paper cash and coins is inconvenient, costly and time consuming for both individuals and financial institution alike. It is estimated that in the United States alone, $60 billion dollars a year is spent by money handlers simply to move money. In addition, the security of paper money is seriously threatened by the relative ease of counterfeiting using, for example, widely accessible, high quality color copiers.

Although checks may be written for any specific amount up to the amount available in the account, checks have very limited transferability and must be supplied from a physical inventory. Paper-based checking systems do not offer sufficient relief from the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House (ACH) and point of sale (POS) systems are examples of electronic funds transfer systems that have become used by retail and commercial organizations on a substantial basis in recent years. However, the payments made through these types of EFT systems are limited in that they cannot be performed without the banking system. Moreover, ACH transactions usually cannot be performed during off business hours.

Due to increased commerce, the cost and volume of commercial transactions have become a concern for merchants, debit processors, and customers. In performing commercial transactions and debit processing, merchants have several debit processors and methods of processing to choose from. However, merchants are provided with little flexibility in changing their debit processing methods. Current options for debit processing include: (1) the merchant relying on a third party to route all debit processing transactions; or (2) the merchant manually changing the debit processing method. Where merchants rely on a third party to route and handle their debit transactions, a merchant has little to no control over the routing methods or the costs involved. Should a merchant attempt to handle the routing of the debit processing, the merchant must manually change the routing method to suit its needs. However, the merchant stands to lose a great amount of time and money due to the inefficiency of changing its debit processing system.

Where merchants rely on third parties to handle their debit processing transactions, third party providers are not capable of providing multi-level routing or systemic low cost routing. For example, several debit platforms of today route all debit transactions to third party provider and allow routing to be based purely on a match between the transaction and the debit processor with no regard to cost issues.

Furthermore, merchants today are not offered alternative methods to process their debit transactions where a primary network is unavailable. The transaction is merely aborted and the merchant must make an additional attempt to process the transaction. This inefficiency creates customer dissatisfaction and limits the merchant's availability to conduct business.

Consequently, a need has developed for a system and method for routing debit processing transactions which routes transactions based on lowest cost and provides merchants with automatic alternatives when a debit processing network is unavailable.

DISCLOSURE OF INVENTION

It is an object of the present invention to overcome the limitations of the prior art by providing a method for routing debit processing transactions based on lowest cost.

It is also an object of the present invention to overcome the limitations of the prior art by providing a debit processing method which sorts available debit networks based on lowest cost.

It is yet another object of the present invention to provide merchants with a method for routing debit processing transactions which routes transactions based on lowest cost.

It is another object of the present invention to provide merchants with automatic alternatives when a debit processing network is unavailable.

It is yet another object of the present invention to shorten the processing and routing time for debit transactions.

Still another object of the present invention is to provide merchants with a means to automatically re-route otherwise invalid transactions.

In accordance with the invention, a method for routing and processing debit transactions is provided which include the steps of a method for processing debit transactions at the lowest cost available, the method comprising the steps of providing a merchant identification number and a customer account number; matching the merchant identification number against at least one merchant database; providing a merchant network list from the at least one merchant database based upon the match of the merchant identification number; providing a customer network list from the at least one merchant database based upon the match of customer identification number; creating a merchant-customer network list by matching at least one common element from the merchant network list and the customer network list; determining the validity for each common element of the merchant-customer network list; eliminating each invalid common element from the merchant-customer network list; sorting the elements of the merchant-customer network list based on network fee; communicating with a routing and processing database to determine the routing and processing method for each merchant customer element; and applying the lowest cost element for routing and processing a debit transaction.

Still more particularly, it is an object of the present invention to provide a bank identification number file which includes a BIN number, an account number length, and a debit network list.

BEST MODE FOR CARRYING OUT THE INVENTION

Figure 1:
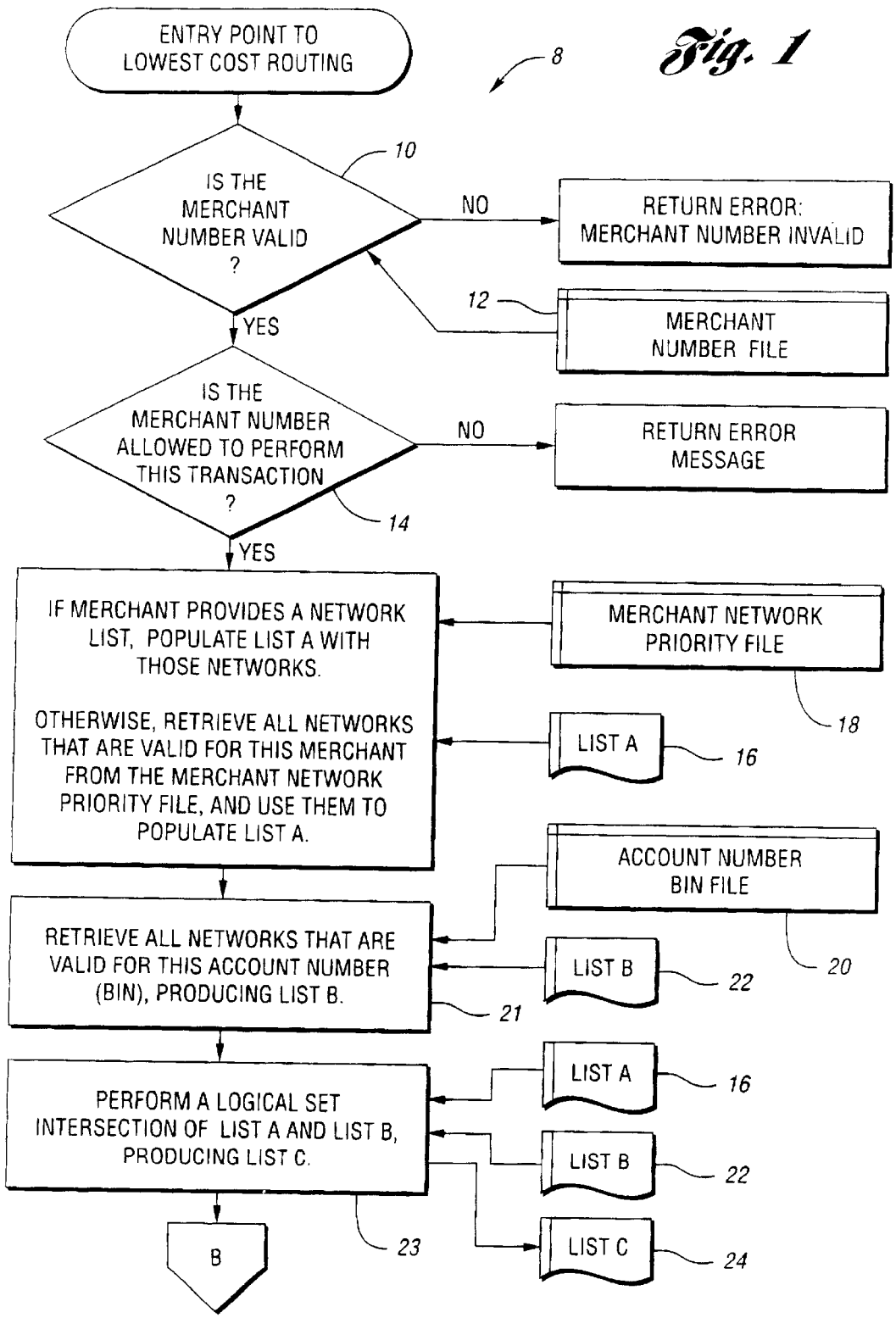
FIGS. 1 and 2 are block diagrams of the method steps of the present invention.

With reference to FIG. 1, the method of the present invention is illustrated. The first step of this method requires an inquiry on behalf of the system to determine whether a merchant number is valid. The merchant number is inputted into the system either automatically or manually. The merchant number may constitute a 16 byte number which uniquely identifies a merchant or merchant location. In determining whether the merchant number is valid, the system 8 compares the merchant number with the merchant number file 12. If the merchant number file 12 shows that the merchant number is flagged for lowest cost routing analysis then the system applies the present invention to the merchant transaction.

The merchant number file 12 includes the following records: (1) the merchant number; (2) a debit network list; (3) a transaction type list; and (4) a lowest cost routing (LCR) flag. The debit network list is a 13 byte record which is comprised of a list of debit networks that the identified merchant is capable of processing. The transaction type list is a 15 byte record which is a list of transaction types which the merchant is capable of processing. The LCR flag indicates whether lowest cost routing should be performed for the identified merchant.

Once the merchant has been identified as a candidate for the application of lowest cost routing 14, a merchant network list 16 is created by matching the merchant identification number with the networks in the merchant network priority file 18. Occasionally, however, a merchant network list may be provided by the merchant and communication with the merchant network priority file is not necessary. The merchant network list 16 consists of those networks which are valid for the identified merchant.

The system 8 then matches 21 the account number for the customer against the account number length records and bank identification numbers (BINs) in a BIN file 20. The BIN file 20 contains the following records: (1) BIN; (2) Account Number Length; and (3) Debit Network List. The BIN is usually a 12 byte record which identifies the banking institution. The account number length may be a 3 byte record which identifies the length of account numbers associated with the identified BIN. The Debit Network List constitutes a list of debit networks that will process account numbers associated with the identified BIN.

Once the corresponding account number length and BIN are matched with the records of the BIN file 20, a debit network list 22 which corresponds to the identified BIN is created. The present invention then performs a logical set intersection 23 of the debit network list 22 and the merchant network list 16 to create a merchant-customer network list 24. The merchant-customer network list 24 is comprised of the common elements of the merchant network list 16 and the debit network list 22.

Figure 2:
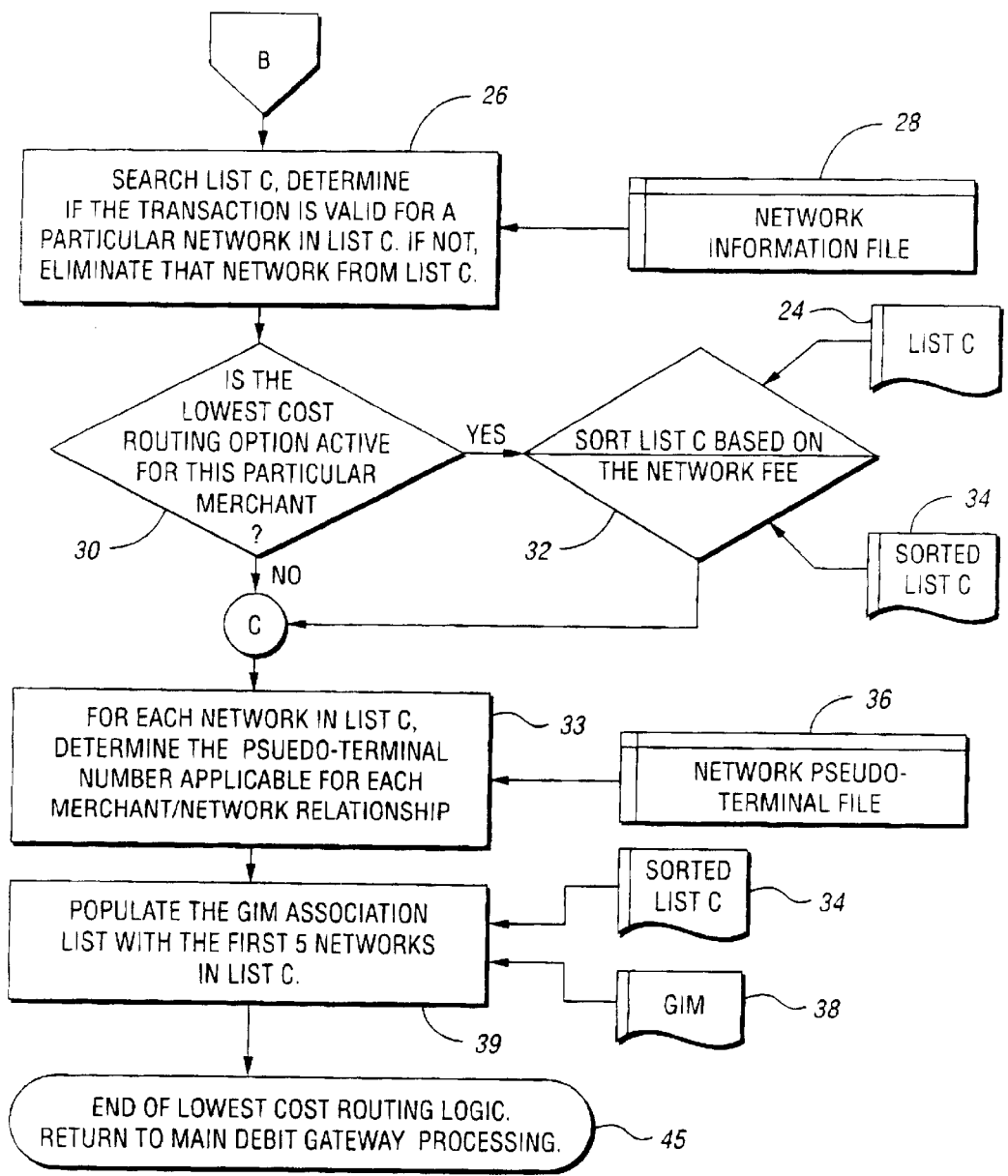

With reference to FIG. 2, the present invention then matches the transaction against each network in the merchant-customer network list 24 and compares the information to a network information file 28 to determine whether the transaction could be processed under each network listed in 24. If the transaction is not compatible with the network listed, the network is eliminated from the merchant-customer network list 24.

The system then inquires whether the lowest cost routing option is active for the particular merchant 30. This determination turns on the LCR flag which resides in the merchant number file 12 as previously defined. In the event that an LCR flag is present and indicates that the merchant is a candidate for lowest cost routing, the merchant-customer network list 24 is sorted 32 according to the network fee or processing fee.

Subsequently, a pseudo terminal number is determined for each network in the sorted merchant-customer network list 34 by matching 33 the networks in the sorted list 34 to the network pseudo terminal file 36. The network pseudo terminal file 36 is a file that a particular debit network assigns to a particular merchant. The pseudo terminal file includes the pseudo terminal number, network identifier, and merchant number. The pseudo terminal number (11 bytes) is an identifier used by a particular network for the individual merchant. The network identifier (3 bytes) is an identifier representing a single debit network. The merchant number (16 bytes) is a number which uniquely identifies the merchant or merchant location.

After the pseudo terminal number is determined for each network of the sorted merchant-customer network list 34, a fourth list called the Generic Internal Message list (GIM) Association 38 is populated 39 with the first five networks in the sorted merchant-customer network list 34.

The transaction is then processed 45 through the lowest cost network in 38. Where the transaction cannot go through, the transaction is automatically routed to the next lowest cost network as provided in the GIM list 38. This feature significantly differs from the prior art in that the entire transaction was normally aborted and re-started where a network was not available to process a transaction.

Figure 3:
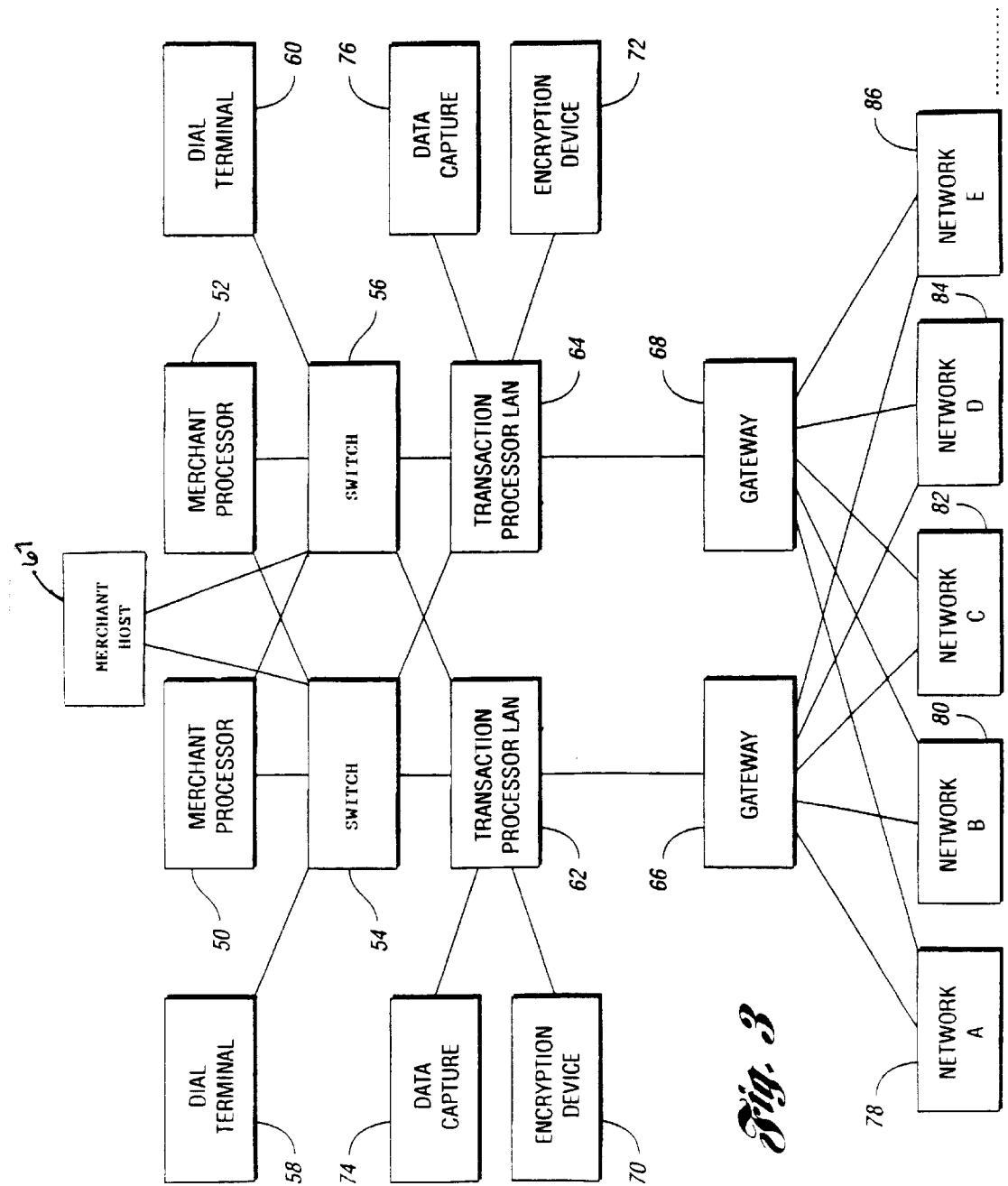
FIG. 3 is a diagram illustrating the system which employs the method steps of the present invention.

With reference to FIG. 3, the system employing the method steps of the present invention is illustrated. As shown, the Merchant Processors 50, 52, Dial Terminals 58, 60 and the Merchant Host 67 are in communication with the switches 54, 56. The Dial Terminals 58, 60 are devices which allow a merchant to provide financial transaction data to the transaction processor. Some merchants employ a host-based system which handles their financial transactions. In that case, the merchant's host 67 may communicate with the switch 54, 56.

The switch determines whether the financial transaction is a debit or credit transaction and routes the transaction to the appropriate location. For example, where the transaction involves debit processing, the transaction is routed to the one of the Local Area Networks (LAN's) 62, 64 and their corresponding gateways 66, 68. In another example, where the transaction involves credit card processing, the transaction is routed to the appropriate issuer (i.e. Visa, Mastercard, etc.). The merchant host 67 communicates with at least one LAN 62, 64. The LANS 62, 64 are also in communication with the gateways 66, 68.

The Local Area Networks (LAN) 62, 64 are also in communication with encryption devices 70, 72 and Data Capture Devices 74, 76. The encryption devices 70, 72 provide added security to transmittal of data while the Data Capture Devices 74, 76 operate to capture images of the transactions or record the data from the gateways 66, 68 and the switches 54, 56.

Once the transactional data reaches the gateways 66, 68, the lowest cost routing method described above is employed at the gateway 66, 68. The transaction is then routed to the appropriate network 78, 80, 82, 84, 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for processing debit transactions at the lowest cost available, the method comprising:

providing a merchant network list which corresponds to the merchant identification number, the merchant network list comprising debit networks available for access by the merchant;

providing a customer network list which corresponds to the customer account number, the customer network list comprising debit networks available for access by the customer account;

matching the debit networks of the merchant network list and the customer network list and generating a merchant-customer network list with the matched debit networks of the merchant network list and the customer network list;

communicating with a network information file and determining the validity for each debit network of the merchant-customer network list to process a debit transaction, each valid debit network of the merchant-customer network list having a cost for processing the debit transaction;

eliminating each invalid debit network from the merchant-customer network list;

sorting the valid debit networks of the merchant-customer network list as a function of the cost for processing the debit transaction;

communicating with a routing and processing database to determine a routing and processing method which corresponds to each debit network of the sorted merchant-customer network list; and applying the first routing and processing method corresponding to the debit network of the sorted merchant-customer network list having the lowest cost to process the debit transaction and if the first routing and processing method is not available, applying the next ranked routing and processing method corresponding to the debit network of the sorted merchant-customer network list having the next lowest cost to process the debit transaction.

2. The method of claim 1 wherein:

the merchant identification number uniquely identifies a merchant.

3. The method of claim 1 wherein:

the merchant network list includes the debit network priority codes defined to represent a particular set of debit networks.

4. The method of claim 3 wherein:

the merchant network list includes a list of debit networks associated with the merchant network priority identifier provided by the merchant.

5. The method of claim 1 wherein:

the network information file includes information for each of the debit networks, the merchant network list including a network identifier record, a transaction type list record, and a fee record.

6. The method of claim 5 wherein:

the network identifier record is an identification number of a single debit network.

7. The method of claim 6 wherein:

the transaction type list record is a list of transaction types that the single debit network will accept.

8. The method of claim 6 wherein:

the fee record includes the fee that the single debit network charges for processing the debit transaction.

9. A system for processing an identified customer's transaction at an identified merchant based on cost, the system comprising:

a processor for matching the identified merchant with a network priority file containing a list of debit networks and transaction types associated with the merchants;

a processor for generating a first list with the debit networks associated with the identified merchant which are valid for processing an identified customer's transaction;

a processor for matching an identified customer with a bank identification file including a bank identification number for the identified customers and a list of debit networks for processing those account numbers for the identified customers;

a processor for populating a second list with the debit networks listed for the identified customer;

a processor for intersecting the first list with the second list to generate a merchant-customer network list having the common debit networks of the first and second lists, each debit network of the merchant-customer network list having a cost for processing the identified customer's transaction;

a processor for sorting the debit networks of the merchant-customer network list as a function of the cost for processing the identified customer's transaction; and a processor for processing the identified customer's transaction through the lowest cost available debit network of the merchant-customer network list.

10. The system of claim 9 further comprising:

a device for determining a pseudo-terminal number for each lower cost network listed in the sorted merchant-customer network list.

11. The system of claim 10 further comprising:

a processing device for populating a Generic Internal Message (GIM) list with at least some of the networks in the sorted merchant-customer network list qualifying as lower cost networks, said processing device processing the customer's transaction through the next lowest cost network in the GIM list if the lowest cost network is unavailable.

* * * * *